(12) United States Patent
Gazard

(10) Patent No.: US 11,014,493 B2
(45) Date of Patent: May 25, 2021

(54) AUTOMOTIVE WARNING STROBE ASSEMBLY

(71) Applicant: David Gazard, Concord, CA (US)

(72) Inventor: David Gazard, Concord, CA (US)

(*) Notice: Subject to any disclaimer, the term of this patent is extended or adjusted under 35 U.S.C. 154(b) by 0 days.

(21) Appl. No.: 16/573,463

(22) Filed: Sep. 17, 2019

(65) Prior Publication Data
US 2021/0078489 A1    Mar. 18, 2021

(51) Int. Cl.
*B60Q 1/46* (2006.01)
*B60Q 1/22* (2006.01)
*B60Q 1/26* (2006.01)
*B60Q 1/50* (2006.01)

(52) U.S. Cl.
CPC .............. *B60Q 1/46* (2013.01); *B60Q 1/22* (2013.01); *B60Q 1/2615* (2013.01); *B60Q 1/50* (2013.01)

(58) Field of Classification Search
CPC ... B60Q 1/46; B60Q 1/50; B60Q 1/22; B60Q 1/2615
USPC ................................ 340/463, 464, 468, 469
See application file for complete search history.

(56) References Cited

U.S. PATENT DOCUMENTS

| | | | |
|---|---|---|---|
| 4,851,810 A * | 7/1989 | Vitale | B60Q 1/2607 362/240 |
| 5,510,763 A | 4/1996 | Deckard | |
| 5,844,479 A * | 12/1998 | Walton | B60Q 1/143 340/479 |
| 6,140,918 A * | 10/2000 | Green | B60Q 1/2611 340/332 |
| 7,137,674 B2 | 11/2006 | Goebels | |
| 7,347,597 B2 * | 3/2008 | French | B60D 1/60 280/164.1 |
| 7,871,188 B1 * | 1/2011 | Turby | B60Q 1/56 362/473 |
| 7,959,322 B2 * | 6/2011 | Smith | F21V 5/007 362/235 |
| 8,807,778 B1 * | 8/2014 | Latchman | A42B 3/0453 362/106 |
| 8,967,840 B1 | 3/2015 | Haney | |
| 9,643,535 B1 * | 5/2017 | Mellem | B60Q 1/448 |
| 9,896,023 B1 * | 2/2018 | Salter | F21S 43/255 |
| 10,118,549 B2 | 11/2018 | Farnaam | |
| 10,272,829 B2 * | 4/2019 | Blevins | B60Q 1/0041 |
| 2003/0063475 A1 * | 4/2003 | Simmons | B60Q 1/24 362/526 |
| 2003/0234724 A1 * | 12/2003 | Chiu | B60Q 1/442 340/464 |
| 2005/0047167 A1 * | 3/2005 | Pederson | B60Q 1/2611 362/542 |
| 2005/0105296 A1 * | 5/2005 | French | B60D 1/60 362/485 |
| 2005/0274050 A1 * | 12/2005 | Liu | G09F 9/33 40/544 |

(Continued)

*Primary Examiner* — Adnan Aziz

(57) ABSTRACT

An automotive warning strobe assembly for alerting an observer that a vehicle is reversing includes a housing that is coupled to a rear deck of a vehicle. In this way the housing is visible to an observer behind the vehicle. A plurality of strobe lights is each coupled to the housing for emitting light outwardly from the housing. Each of the strobe lights is electrically coupled to a reverse gear circuit of the vehicle. Thus, each of the strobe lights is turned on when the reverse gear circuit is actuated. In this way the observer behind the vehicle is alerted that the vehicle is reversing.

7 Claims, 5 Drawing Sheets

(56) References Cited

U.S. PATENT DOCUMENTS

| | | | |
|---|---|---|---|
| 2006/0125616 A1* | 6/2006 | Song | B60Q 1/38 340/463 |
| 2007/0115680 A1* | 5/2007 | Tsai | B60Q 1/302 362/544 |
| 2010/0141419 A1* | 6/2010 | Coward | B60Q 1/22 340/464 |
| 2011/0032718 A1* | 2/2011 | Bryant | B60Q 1/56 362/497 |
| 2012/0081915 A1* | 4/2012 | Foote | B60Q 1/245 362/494 |
| 2013/0141926 A1 | 6/2013 | McDermott | |
| 2013/0265791 A1* | 10/2013 | Dassanayake | F21S 43/14 362/520 |
| 2014/0145837 A1 | 5/2014 | Douglas | |
| 2016/0091188 A1* | 3/2016 | Milligan | B60Q 1/34 362/105 |
| 2016/0097493 A1* | 4/2016 | Anderson | G03B 15/03 362/8 |
| 2017/0028902 A1* | 2/2017 | Diaz | B60Q 1/22 |
| 2017/0332458 A1* | 11/2017 | Salter | F21S 45/50 |
| 2017/0336046 A1* | 11/2017 | LaMarche | F21S 43/195 |
| 2018/0065540 A1 | 3/2018 | Click | |
| 2018/0222381 A1* | 8/2018 | Johnson | F21S 43/37 |
| 2018/0242674 A1* | 8/2018 | Smith | A42B 3/0453 |
| 2019/0248273 A1* | 8/2019 | Sassoon | F21S 43/19 |
| 2019/0248278 A1* | 8/2019 | Salter | B60Q 1/44 |
| 2020/0398739 A1* | 12/2020 | Hanson | B60Q 1/22 |

* cited by examiner

AUTOMOTIVE WARNING STROBE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to strobe device and more particularly pertains to a new strobe device for alerting an observer that a vehicle is reversing.

(2) Description of Related Art Including Information Disclosed Under 37 CFR 1.97 and 1.98

The prior art relates to strobe device.

BRIEF SUMMARY OF THE INVENTION

An embodiment of the disclosure meets the needs presented above by generally comprising a housing that is coupled to a rear deck of a vehicle. In this way the housing is visible to an observer behind the vehicle. A plurality of strobe lights is each coupled to the housing for emitting light outwardly from the housing. Each of the strobe lights is electrically coupled to a reverse gear circuit of the vehicle. Thus, each of the strobe lights is turned on when the reverse gear circuit is actuated. In this way the observer behind the vehicle is alerted that the vehicle is reversing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
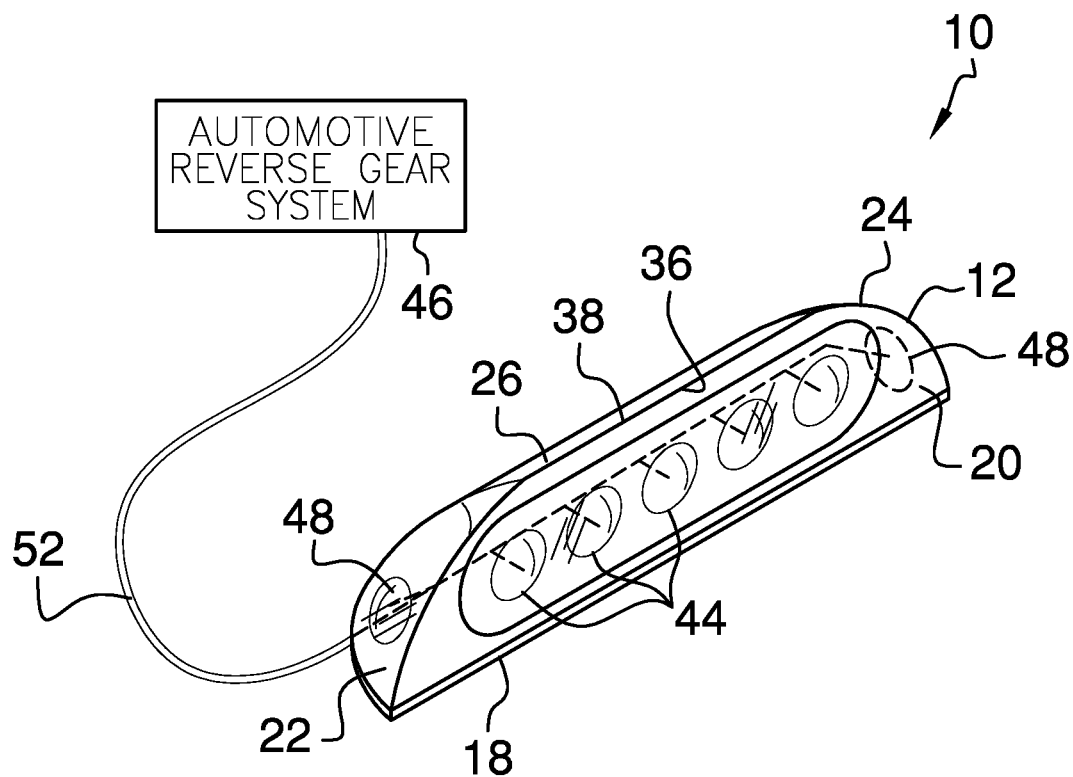
FIG. 1 is a perspective view of an automotive warning strobe assembly according to an embodiment of the disclosure.
Figure 2:
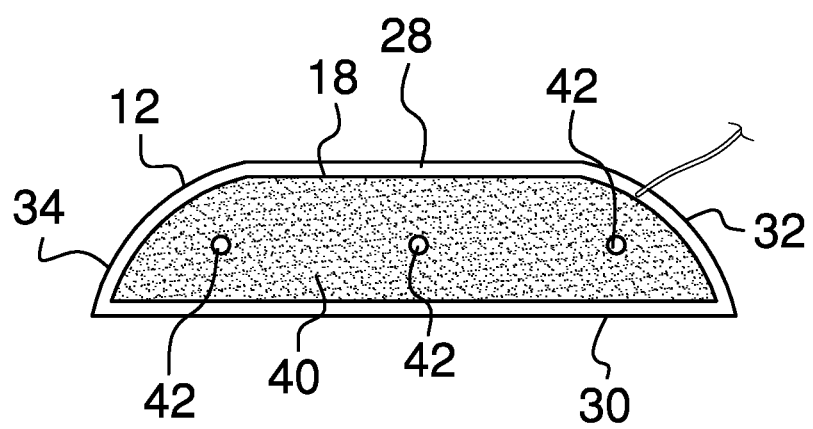
FIG. 2 is a bottom view of an embodiment of the disclosure.
Figure 3:
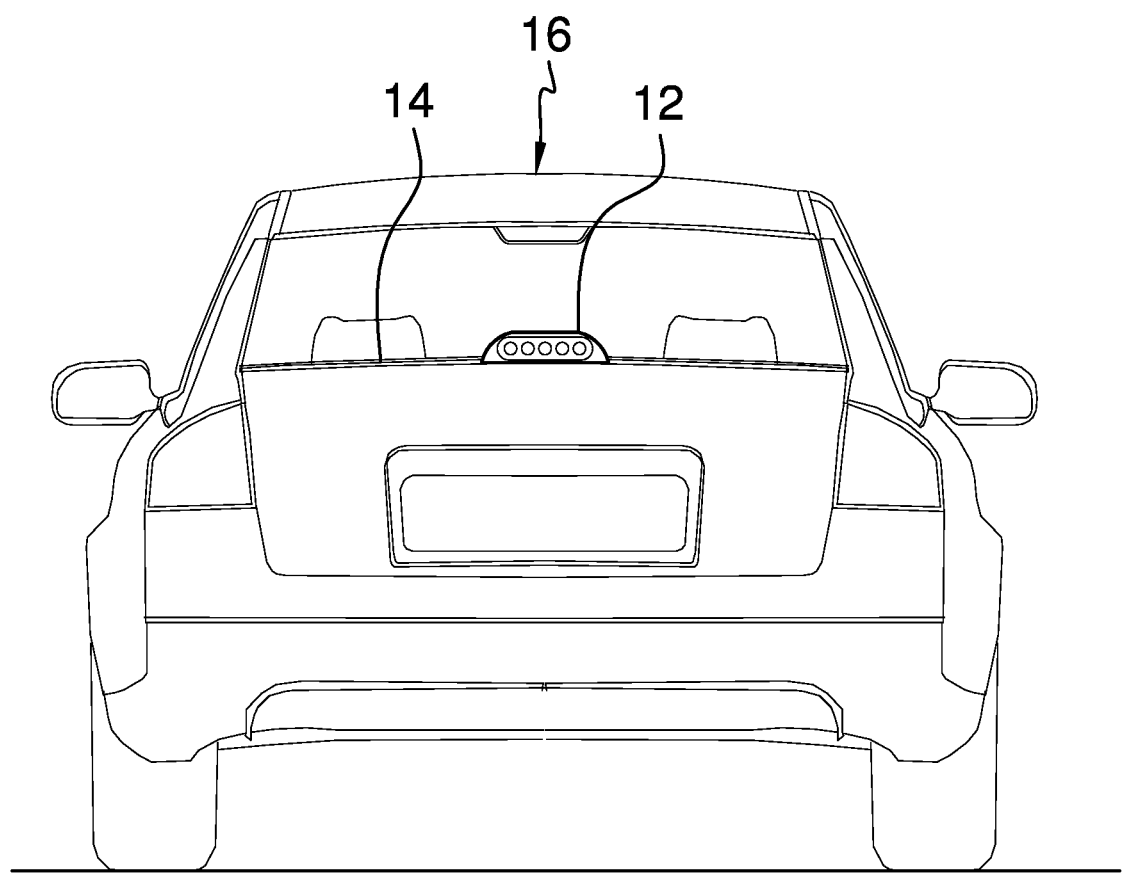
FIG. 3 is a rear in-use view of an embodiment of the disclosure.
Figure 4:
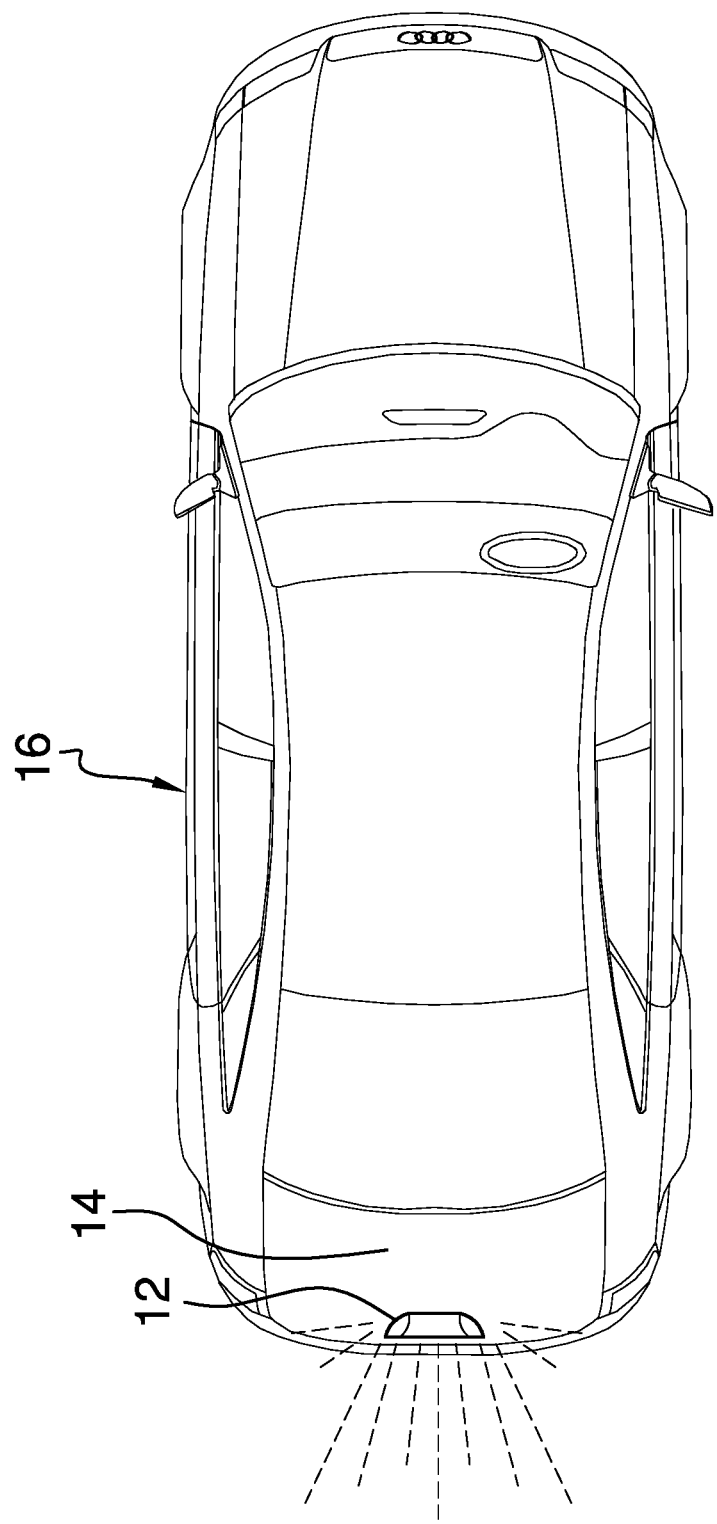
FIG. 4 is a top in-use view of an embodiment of the disclosure.
Figure 5:
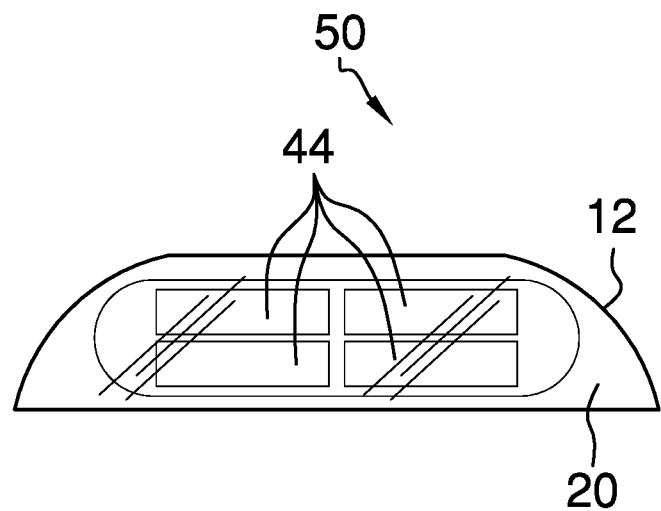
FIG. 5 is a perspective view of an alternative embodiment of the disclosure.

With reference now to the drawings, and in particular to FIGS. 1 through 5 thereof, a new strobe device embodying the principles and concepts of an embodiment of the disclosure and generally designated by the reference numeral 10 will be described.

As best illustrated in FIGS. 1 through 5, the automotive warning strobe assembly 10 generally comprises a housing 12 is coupled to a rear deck 14 of a vehicle 16. In this way the housing 12 is visible to an observer behind the vehicle 16. The vehicle 16 may be a passenger vehicle, a cargo vehicle or any other motorized vehicle that is driven on public roadways. Additionally, the rear deck 14 may be a trunk lid or other horizontal surface near the back end of the vehicle 16. The housing 12 has a bottom wall 18, a back wall 20, a first lateral wall 22, a second lateral wall 24 and a front wall 26. The bottom wall 18 has a front edge 28, a back edge 30, a first lateral edge 32 and a second lateral edge 34.

Each of the first lateral edge 32 and the second lateral edge 34 is concavely arcuate between the back edge 30 and the front edge 28. The back wall 20 is flattened and the front wall 26 is concavely arcuate with respect to the back wall 20. Moreover, an upper threshold 36 of the front wall 26 intersects an upper threshold 38 of the back wall 20. Each of the first lateral wall 22 and the second lateral wall 24 curves inwardly toward a center of the housing 12. The bottom wall 18 is positioned on the rear deck 14 of the vehicle 16. Additionally, the housing 12 may be comprised of a translucent material such as clear plastic or the like.

An adhesive layer 40 is bonded to the bottom wall 18 of the housing 12 and the adhesive layer 40 completely covers the bottom wall 18. The adhesive layer 40 adhesively engages the rear deck 14 for retaining the housing 12 on the rear deck 14. The bottom wall 18 of the housing 12 has a plurality of apertures 42 extending therethrough. A plurality of fasteners, such as screws or the like, are extendable through the apertures 42 to engage the rear deck 14 of the vehicle 16.

A plurality of first strobe lights 44 is each coupled to the housing 12 to emit light outwardly from the housing 12. Each of the first strobe lights 44 is electrically coupled to a reverse gear circuit 46 of the vehicle 16. Additionally, each of the first strobe lights 44 is turned on when the reverse gear circuit 46 is actuated. In this way the observer behind the vehicle 16 is alerted that the vehicle 16 is reversing. Each of the first strobe lights 44 is positioned on the back wall 20 of the housing 12 and the first strobe lights 44 are spaced apart from each other and are distributed between the first lateral wall 22 and the second lateral wall 24 of the housing 12.

A pair of second strobe lights 48 is provided and each of the second strobe lights 48 is coupled to the housing 12 to emit light outwardly from the housing 12. Each of the second strobe lights 48 lies on a plane that is oriented at an angle with respect to the plurality of first strobe lights 44. Each of the second strobe lights 48 is electrically coupled to the reverse gear circuit 46 of the vehicle 16 and each of the second strobe lights 48 is turned on when the reverse gear circuit 46 is actuated. Additionally, each of the second strobe lights 48 is positioned on a respective one of the first lateral wall 22 and the second lateral wall 24 of the housing 12.

Each of the first strobe lights 44 and the second strobe lights 48 may comprise an LED or other type of electronic light emitter. As is most clearly shown in FIGS. 1 through 4, each of the first strobe lights 44 and the second strobe lights 48 may have a circular shape. In an alternative embodiment 50 as is most clearly shown in FIG. 5, each of the first strobe lights 44 and the second strobe lights 48 may have a rectangular shape. A conductor 52 is coupled to and extends outwardly from the housing 12. The conductor 52 is electrically coupled between the first strobe lights 44, the second strobe lights 48 and the reverse gear circuit 46 of the vehicle 16.

In use, for the purposes of retrofitting on existing vehicles, the bottom wall 18 of the housing 12 is attached to the rear deck 14 of the vehicle 16 with either the adhesive layer 40, the fasteners or both. The conductor 52 is electrically coupled to the reverse gear circuit 46 at a strategic location. Thus, each of the first strobe lights 44 and the second strobe lights 48 are turned on when the reverse gear circuit 46 is actuated. In this way the first strobe lights 44 and the second strobe lights 48 visually alert the observer that the vehicle 16 is reversing. In a factory manufacturing environment, the housing 12 is attached to the vehicle 16 while the vehicle 16 is being manufactured.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automotive warning strobe assembly being configured to emit a visual alert when a vehicle is driving in reverse, said assembly comprising:
   a housing being coupled to a rear deck of a vehicle wherein said housing is configured to be visible to an observer behind the vehicle;
   a plurality of first strobe lights, each of said first strobe lights being coupled to said housing wherein each of said first strobe lights is configured to emit light outwardly from said housing, each of said first strobe lights being electrically coupled to a reverse gear circuit of the vehicle, each of said first strobe lights being turned on when the reverse gear circuit is actuated wherein each of said first strobe lights is configured to alert the observer behind the vehicle that the vehicle is reversing; and
   a pair of second strobe lights, each of said second strobe lights being coupled to said housing wherein each of said second strobe lights is configured to emit light outwardly from said housing, each of said second strobe lights lying on a respective plane being oriented at an angle with respect to said plurality of first strobe lights such that said pair of second strobe lights are directed outwardly from opposite ends of said housing, each of said second strobe lights being electrically coupled to the reverse gear circuit of the vehicle, each of said second strobe lights being turned on when the reverse gear circuit is actuated.

2. The assembly according to claim 1, wherein said housing has a bottom wall, a back wall, a first lateral wall, a second lateral wall and a front wall, said bottom wall having a front edge, a back edge, a first lateral edge and a second lateral edge, each of said first lateral edge and said second lateral edge being concavely arcuate between said back edge and said front edge.

3. The assembly according to claim 2, wherein said back wall is flattened, said front wall being concavely arcuate with respect to said back wall such that an upper threshold of said front wall intersects an upper threshold of said back wall, each of said first lateral wall and said second lateral wall curving inwardly toward a center of said housing, said bottom wall being positioned on said rear deck of the vehicle.

4. The assembly according to claim 3, further comprising an adhesive layer being bonded to said bottom wall of said housing, said adhesive layer completely covering said bottom wall, said adhesive layer adhesively engaging the rear deck for retaining said housing on the rear deck.

5. The assembly according to claim 3, wherein each of said first strobe lights is positioned on said back wall of said housing, said first strobe lights being spaced apart from each other and being distributed between said first lateral wall and said second lateral wall of said housing.

6. The assembly according to claim 3, wherein each of said second strobe lights is positioned on a respective one of said first lateral wall and said second lateral wall of said housing.

7. An automotive warning strobe assembly being configured to emit a visual alert when a vehicle is driving in reverse, said assembly comprising:
   a housing being coupled to a rear deck of a vehicle wherein said housing is configured to be visible to an observer behind the vehicle, said housing having a bottom wall, a back wall, a first lateral wall, a second lateral wall and a front wall, said bottom wall having a front edge, a back edge, a first lateral edge and a second lateral edge, each of said first lateral edge and said second lateral edge being concavely arcuate between said back edge and said front edge, said back wall being flattened, said front wall being concavely arcuate with respect to said back wall such that an upper threshold of said front wall intersects an upper threshold of said back wall, each of said first lateral wall and said second lateral wall curving inwardly toward a center of said housing, said bottom wall being positioned on said rear deck of the vehicle;

an adhesive layer being bonded to said bottom wall of said housing, said adhesive layer completely covering said bottom wall, said adhesive layer adhesively engaging the rear deck for retaining said housing on the rear deck;

a plurality of first strobe lights, each of said first strobe lights being coupled to said housing wherein each of said first strobe lights is configured to emit light outwardly from said housing, each of said first strobe lights being electrically coupled to a reverse gear circuit of the vehicle, each of said first strobe lights being turned on when the reverse gear circuit is actuated wherein each of said first strobe lights is configured to alert the observer behind the vehicle that the vehicle is reversing, each of said first strobe lights being positioned on said back wall of said housing, said first strobe lights being spaced apart from each other and being distributed between said first lateral wall and said second lateral wall of said housing; and a pair of second strobe lights, each of said second strobe lights being coupled to said housing wherein each of said second strobe lights is configured to emit light outwardly from said housing, each of said second strobe lights lying on a respective plane being oriented at an angle with respect to said plurality of first strobe lights such that said pair of second strobe lights are directed outwardly from opposite ends of said housing, each of said second strobe lights being electrically coupled to the reverse gear circuit of the vehicle, each of said second strobe lights being turned on when the reverse gear circuit is actuated, each of said second strobe lights being positioned on a respective one of said first lateral wall and said second lateral wall of said housing.

\* \* \* \* \*